(12) United States Patent
Mikan et al.

(10) Patent No.: US 8,116,744 B1
(45) Date of Patent: Feb. 14, 2012

(54) ADVANCED MESSAGE WAITING INDICATION SYSTEM

(75) Inventors: Jeffrey Clinton Mikan, Atlanta, GA (US); Justin McNamara, Atlanta, GA (US); John Lewis, Lawrenceville, GA (US); Fulvio Cenciarelli, Suwanee, GA (US); Adrianne Luu, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 823 days.

(21) Appl. No.: 11/848,372

(22) Filed: Aug. 31, 2007

(51) Int. Cl.
*H04M 11/10* (2006.01)

(52) U.S. Cl. .................. 455/413; 455/412.1; 455/412.2; 455/414.1; 455/415

(58) Field of Classification Search .................. 455/413, 455/412.1, 412.2, 414.1, 415
See application file for complete search history.

(56) References Cited

U.S. PATENT DOCUMENTS

| | | | | |
|---|---|---|---|---|
| 4,935,954 A * | 6/1990 | Thompson et al. | ........ | 379/88.04 |
| 5,963,618 A * | 10/1999 | Porter | ......................... | 704/270.1 |
| 5,995,596 A * | 11/1999 | Shaffer et al. | .............. | 379/88.18 |
| 6,263,202 B1 * | 7/2001 | Kato et al. | ..................... | 455/418 |
| 2005/0180548 A1 * | 8/2005 | Moore | ........................ | 379/88.12 |
| 2005/0248437 A1 * | 11/2005 | Hellebust et al. | ............ | 340/7.51 |

* cited by examiner

*Primary Examiner* — Nick Corsaro
*Assistant Examiner* — Amanuel Lebassi
(74) *Attorney, Agent, or Firm* — Parks IP Law LLC; Mickki D. Murray, Esq.

(57) ABSTRACT

An advanced message waiting indication system includes the ability to provide message waiting indicators for a plurality of voice mail ("VM") systems. When a message is left on a remote VM system, a message waiting notification is passed to a centralized VM system. The centralized VM system can connect to the remote VM system, authenticate as the user, download the messages and accompanying data, and then disconnect from the remote VM system. The message and accompanying data can then be used to determine a message waiting indicator (MWI) that is then passed to an electronic device for display. The MWI can inform a user about many aspects of the waiting messages.

13 Claims, 10 Drawing Sheets

ADVANCED MESSAGE WAITING INDICATION SYSTEM

TECHNICAL FIELD

The present invention relates generally to the field of electronic devices. More particularly, the present invention relates to an advanced message waiting indication system.

BACKGROUND

With the proliferation of mobile communications devices has come an increased demand for new features for these devices. There is a high demand for mobile communications device features that make the devices more user-friendly, for example, by increasing ease and accuracy with which common tasks may be performed and/or with which the device may be used.

As is known, mobile communications devices are often used as part of a mobile communications plan. A common feature of mobile communications devices and plans is voice mail capability. "Voice mail" ("VM") refers to the ability of phone systems to store an audio or text message (e.g., an announcement or a message, and the like) for an unavailable phone system user. When the user retrieves the message, the recorded audio or text can be reviewed. VM has become a fairly standard feature for mobile communications plans and devices, and is becoming more prevalent in home- and office-based phone systems.

When a VM is recorded for the user of a mobile communications device, a message waiting indicator can be sent to the mobile communications device. When the device receives notification from the VM system that a message is waiting, the device can display a message waiting indicator to inform the user that message(s) are waiting.

Message waiting indicators enable a user to know the status of a VM box system without dialing into the system, or otherwise checking the status of the system. Therefore, message waiting indication has become a fairly standard feature on many devices and with many voice/data plans.

SUMMARY

An advanced message waiting indication system includes the ability to provide message waiting indicators for a plurality of VM systems. When a message is left on a remote VM system, a message waiting notification is passed to a centralized VM system. The centralized VM system can be configured to connect to the remote VM system, authenticate, download the messages and accompanying data (e.g., call priority, caller ID information, date and time, and the like), and then disconnect from the remote VM system. The message and accompanying data can then be used to determine a specialized message waiting indicator (MWI).

The MWI can be based on information customized by the user of an electronic device (e.g., a handset, a phone, a laptop, a PDA, combinations thereof, and the like), or can be set by anyone with authority (e.g., the user, an employer who pays for a voice/data plan, and the like). Once the MWI is determined, the MWI can be passed to one or more devices. The MWI can be displayed by the device and can include various data. For example, an MWI according to an exemplary embodiment of the present invention can include a visual representation of the VM system from which the message was obtained, the sender of the message, and a priority code for the message.

After receiving the MWI, the user can connect to one convenient "mailbox" on the centralized VM system to download messages left on multiple VM systems. This streamlines message delivery and can help a user receive messages of high priority fairly quickly. For example, if a user is out of the office, he can receive an MWI when a message is left on his office VM system. This can help avoid missing an important client message, for example.

Accordingly, an embodiment of the present invention includes a multiple voice mail system notification network including at least one remote voice mail system, a centralized voice mail system, and an electronic device.

The remote voice mails system(s) can be configured to store data associated with a communication that is passed to the remote voice mail system by an associated remote telephone system. Upon storing communication data, the remote voice mail system(s) can be configured to send message waiting notifications to the centralized voice mail system.

The centralized voice mail system can be configured to connect to the remote voice mail systems to retrieve communication data, and the connection can be prompted by receipt of a message waiting notification. From the communication data, the centralized voice mail system can determine a message waiting indicator that can be transmitted to an electronic device, for example a handset or other mobile communications device.

According to another embodiment of the present invention, there is taught a method for providing a message waiting indicator to an electronic device including receiving a communication at a remote voice mail system and storing data associated with the communication at the remote voice mail system. The remote voice mail system then transfers a message waiting notification from the remote voice mail system to a centralized voice mail system. After receiving the message waiting notification, the centralized voice mail system can establish a connection with the remote voice mail system, authenticate on the remote voice mail system, and data associated with the communication from the remote voice mail system can be transferred to the centralized voice mail system. The centralized voice mail system can then use the retrieved communication data to determine a message waiting indicator and can transfer the determined message waiting indicator to the electronic device.

The communication data can include the date and time of the communication, source information, e.g., a telephone number or an electronic address of a caller who initiated the communication, or other data, for example, a place holder, a priority level, the length of the message, combinations thereof and the like.

Another embodiment of the present invention includes a computer-readable medium comprising computer-executable instructions that, when executed, performs the method described above.

These and further features of the present invention will be apparent with reference to the following description and attached drawings.

DESCRIPTION

Figure 1:
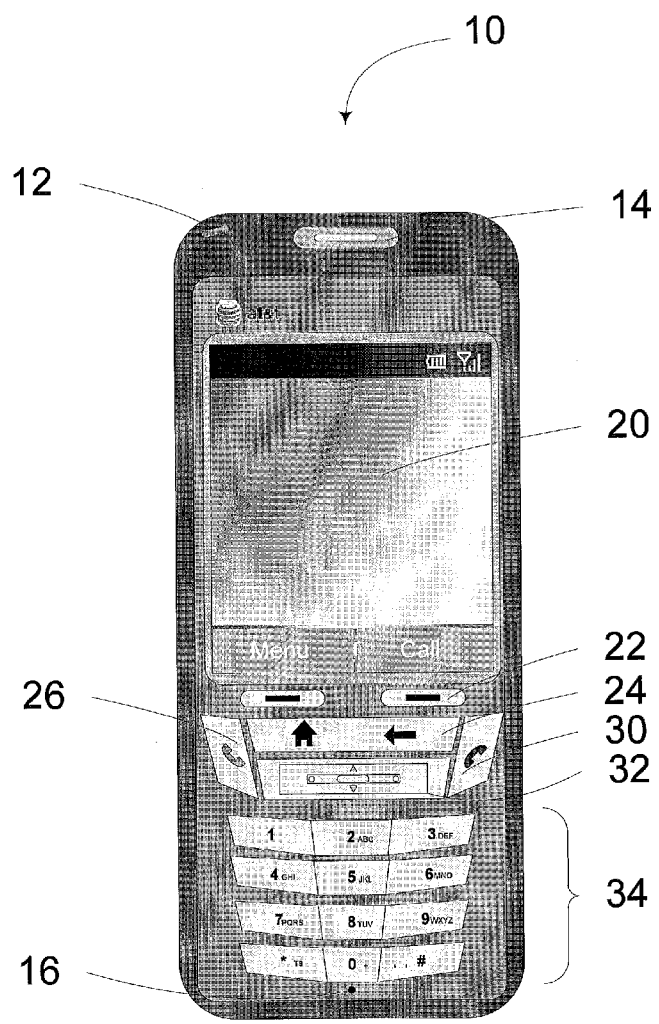
FIG. 1 is a plan view of an exemplary mobile communications device.

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

As used in this application, the phrase "message waiting indicator," or its abbreviation "MWI," includes data that is sent to an electronic device. In a typical voice mail system, the VM system sends a SMS message to a device prompting the device to display the message waiting indication. After the user has retrieved the messages, the VM system sends another SMS message prompting the device to stop displaying the message waiting indication. In this application, the MWI may include information about the call such as the phone number of the caller, the voice mail system upon which the message was left, and the like, and may include a custom icon for display by the device. This custom MWI data packet can be sent using SMS, MMS, email, a combination thereof, or the like.

The phrases "message waiting notification," "message waiting indicator," and "MWI," also include notifications and information associated with missed calls in addition to waiting messages. Therefore, a "message waiting indicator" is not limited to indicating the existence of stored audio or text messages. Rather, a "message waiting indicator" may inform the centralized VM system that information associated with a missed call is waiting at a remote VM system.

Furthermore, in the case of missed calls, the "message," i.e., the call data, can be, but is not necessarily, stored on a remote VM system. However, the phrase "remote VM system" is used in this context to include the system that stores missed call data. This use is employed since the method used to pass missed call indicators to an electronic device is substantially similar to the method used to pass message waiting indicators to the electronic device. Though the names of the systems may differ, the function of the systems, insofar as the recording of missed call data and the recording of message waiting data, are substantially similar. Use of the same terminology (e.g., message and remote VM system) is made for purposes of simplifying description of the various methods.

As used in this application, the phrase "remote voice mail system," or its shorthand form "remote VM system," is used to denote a substantially typical voice mail system. The phrase "centralized voice mail system," or its shorthand form "centralized VM system," is used to denote a voice mail system to which message waiting notifications are sent. While the remote VM system and the centralized VM system are generally separate systems, it is possible that one VM system can function as both a remote VM system and a centralized VM system. However, systems with a centralized VM system typically have at least one remote VM system that is not the centralized VM system (i.e., there are typically at least two VM systems). As will be explained later, it is also entirely possible, and contemplated, that multiple remote VM systems can complete the functions of the centralized VM system, thereby eliminating the need for a centralized VM system.

Referring initially to FIG. 1, an exemplary electronic device 10 is illustrated. The electronic device 10 can be a mobile communications device, for example, a personal digital assistant ("PDA"), a handset, a portable computer, any device capable of receiving a message, combinations thereof, and the like. In the illustrated exemplary embodiment, the electronic device 10 is a mobile communications device ("device"). The device 10 can include an indicator 12. The indicator can be, for example, a light emitting diode (LED) that indicates various status states of the device 10. The device 10 includes a speaker 14 and a microphone 16. The speaker 14 and the microphone 16 collectively and respectively transmit and receive audio signals. The device 10 includes a display 20 for communicating features and status to the user, and for enabling the user to navigate the control system and use various features of the device. The display 20 may also be used to display, for example, photographs, videos, movies, streaming video, GPS information, email, Internet, VM options, combinations thereof, and the like. As illustrated, the device 10 can include a plurality of keys, including softkeys 22, function keys 24, an initiate call key 26, and a terminate call key 30. Some devices can also include a directional key 32. A directional key 32 can allow navigation through various menus and lists and/or can facilitate control of various features of the device. Instead of a directional key, some devices include a joy stick, a roller wheel, a rocker switch, or the like. A mobile communications device 10 generally includes an alpha-numeric keypad 34 for inputting numbers and/or letters while interacting with the device 10.

Figure 2:
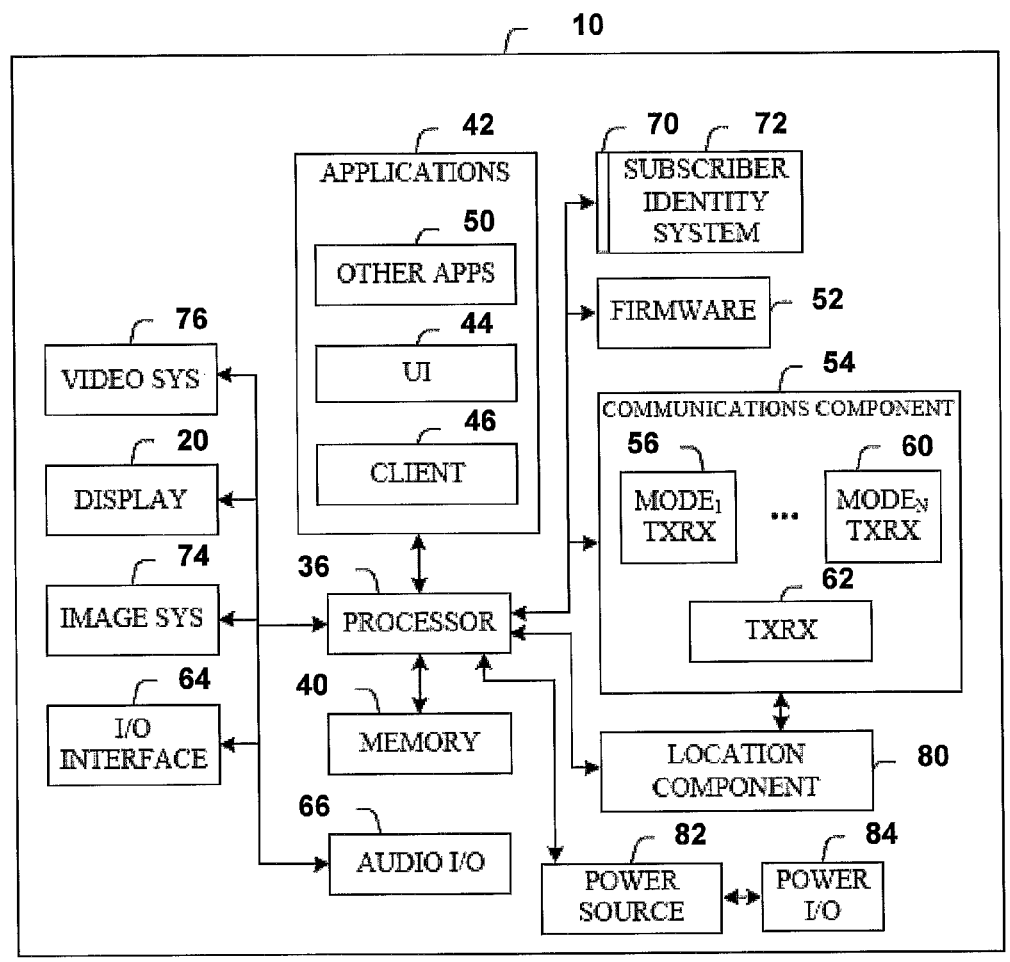
FIG. 2 is a schematic diagram of an exemplary mobile communications device.

FIG. 2 illustrates a schematic block diagram of an exemplary mobile communications device 10 for use in accordance with an exemplary embodiment of the present invention. As illustrated, the mobile communications device 10 can be a multimode handset. FIG. 2 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software.

Generally, applications (e.g., program modules) can include routines, programs, components, data structures, and the like, that perform particular tasks or implement particular abstract data types. Moreover, the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The device 10 can include a variety of computer readable media. Computer readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the handset systems.

The device 10 includes a processor 36 for controlling and processing onboard operations and functions. A memory 40 interfaces to the processor 36 for the storage of data and one or more applications 42 (e.g., a video player software, user feedback component software, and the like). The applications 42 can also include a user interface (UI) application 44 that operates with a client 46 (e.g., operating system) to facilitate user interaction with handset functionality and data, for example, answering/initiating calls, entering/deleting data, configuring settings, address book manipulation, multimode interaction, and the like. The applications 42 can include other applications 50 installed with the handset 42 and/or installed as add-ons or plug-ins to the client 46 and/or UI 44, for example, or for other purposes (e.g., processor, firmware, and the like).

The other applications 50 can include voice recognition of predetermined voice commands that facilitate user control, call voice processing, voice recording, messaging, e-mail processing, video processing, image processing, music play, as well as subsystems or components described infra. Some of the applications 42 can be stored in the memory 40 and/or in a firmware 52, and executed by the processor 36 from either or both the memory 40 or/and the firmware 52. The firmware 52 can also store code for execution in power-up initialization and control during normal operation of the device 10.

A communications component 54 can interface to the processor 36 to facilitate wired/wireless communications with external systems, for example, cellular networks, VoIP (voice-over-IP) networks, local wireless networks or personal wireless networks such as Wi-Fi, Wi-Max, combinations thereof, and the like. Here, the communications component 54 can also include a multimode communications subsystem for providing cellular communications via different cellular technologies. For example, a first cellular transceiver 56 (e.g., GSM) can be one mode and an Nth transceiver 60 can provide cellular communications via an Nth cellular network (e.g., UMTS), where N is a positive integer. The communications component 54 can also include a transceiver 62 for unlicensed communications (e.g., Wi-Fi, Wi-Max, Bluetooth, and the like) for corresponding communications. The communications component 54 can also facilitate communications reception from terrestrial radio networks (e.g., broadcast), digital satellite radio networks, and Internet-based radio services networks.

The device 10 can process IP data traffic via the communications component 54 to accommodate IP traffic from an IP network such as, for example, the Internet, a corporate intranet, a home broadband network, a personal area network, and the like, via an ISP or broadband cable provider. Thus, VoIP traffic can be utilized by the device 10 and IP-based multimedia content can be received in an encoded and/or decoded format.

The device 10 includes a display 20 for displaying multimedia that include text, images, video, telephony functions (e.g., a Caller ID function), setup functions, menus, and the like. The display 20 can also accommodate the presentation of multimedia content (e.g., music metadata, messages, wallpaper, graphics, and the like).

An input/output (I/O) interface 64 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, and the like). The I/O interface 64 can be utilized for updating and/or troubleshooting the device 10, for example.

Audio capabilities can be provided via an audio I/O component 66, which can include a speaker 14 (FIG. 1) for the output of audio signals related to, for example, indication that the user pressed the proper key or key combination to initiate the user feedback signal, call signals, music, and the like. The audio I/O component 66 also facilitates the input of audio signals via a microphone 16 to record data and/or telephony voice data, and for inputting voice signals for telephone conversations.

The device 10 can include a slot interface 70 for accommodating a subscriber identity system 72 that can accommodate a SIM or universal SIM (USIM), and interfacing the subscriber identity system 72 with the processor 36. However, it is to be appreciated that the subscriber identity system 72 can be manufactured into the device 10, and updated by downloading data and software thereto.

An image capture and processing system 74 (e.g., a camera) can be provided for decoding encoded image content. Additionally, as indicated, photos can be obtained via an associated image capture subsystem of the image system 74. The device 10 can also include a video component 76 for processing video content received and, for recording and transmitting video content.

Optionally, a geolocation component 80 (e.g., GPS-global positioning system) facilitates receiving geolocation signals (e.g., from satellites via the communications component 54) that define the location of the device 10. Alternatively, or in combination therewith, the geolocation component 80 can facilitate triangulation processing for locating the device 10.

The device 10 also includes a power source 82 in the form of batteries and/or an AC power subsystem. The power source 82 can interface to an external power system or charging equipment (not shown) via a power I/O component 84.

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b, also referred to as 802.11 High Rate DSSS or Wi-Fi, is an extension to 802.11 that applies to wireless LANs and provides 11 Mbps transmission, with a fallback to 5.5, 2 and 1 Mbps in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wire Ethernet networks used in many locations.

Figure 3A:
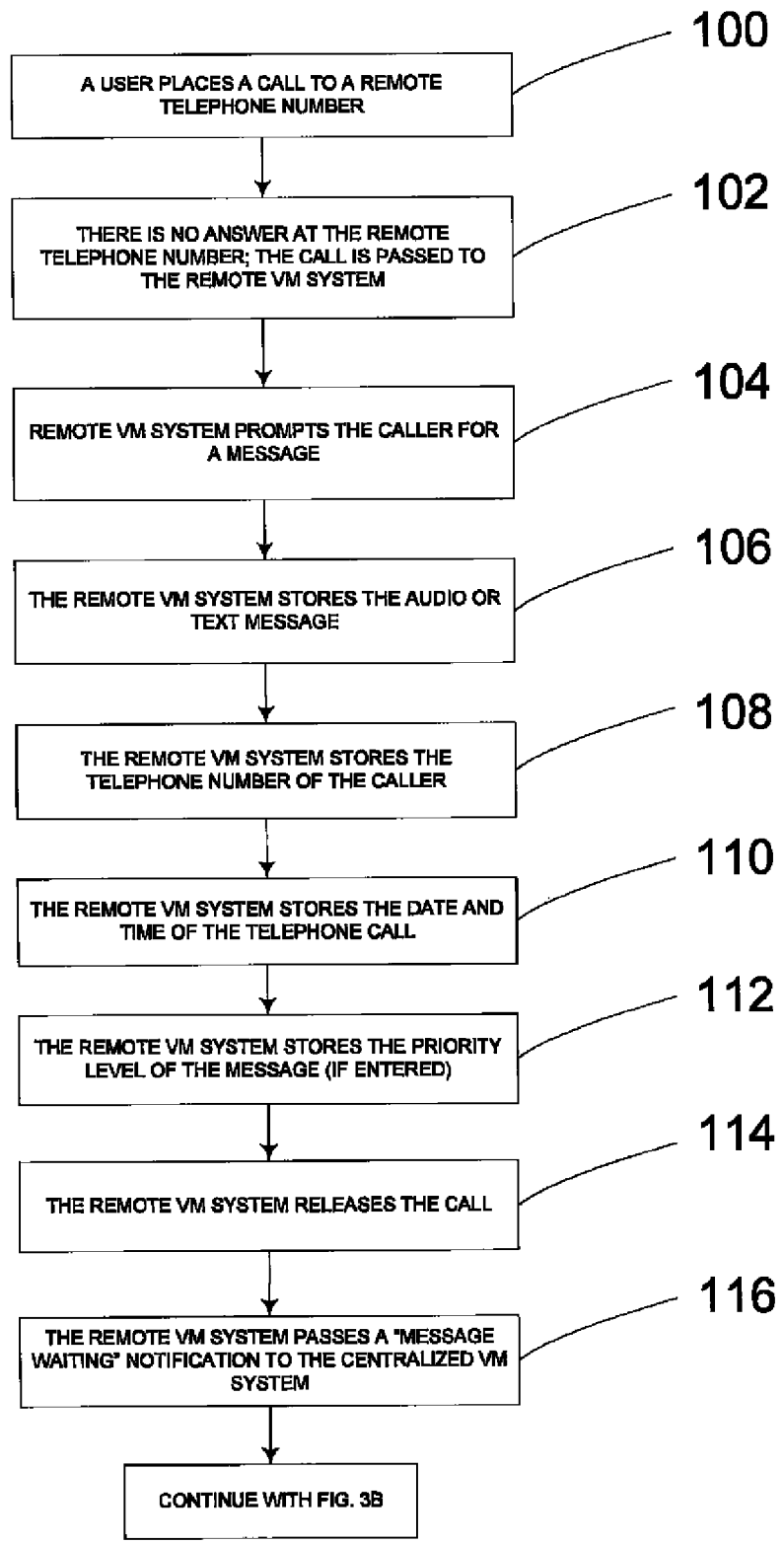
FIGS. 3A-3C schematically represent a method of sending an advanced message waiting indicator to an electronic device, according to an exemplary embodiment of the present invention.
Figure 3B:
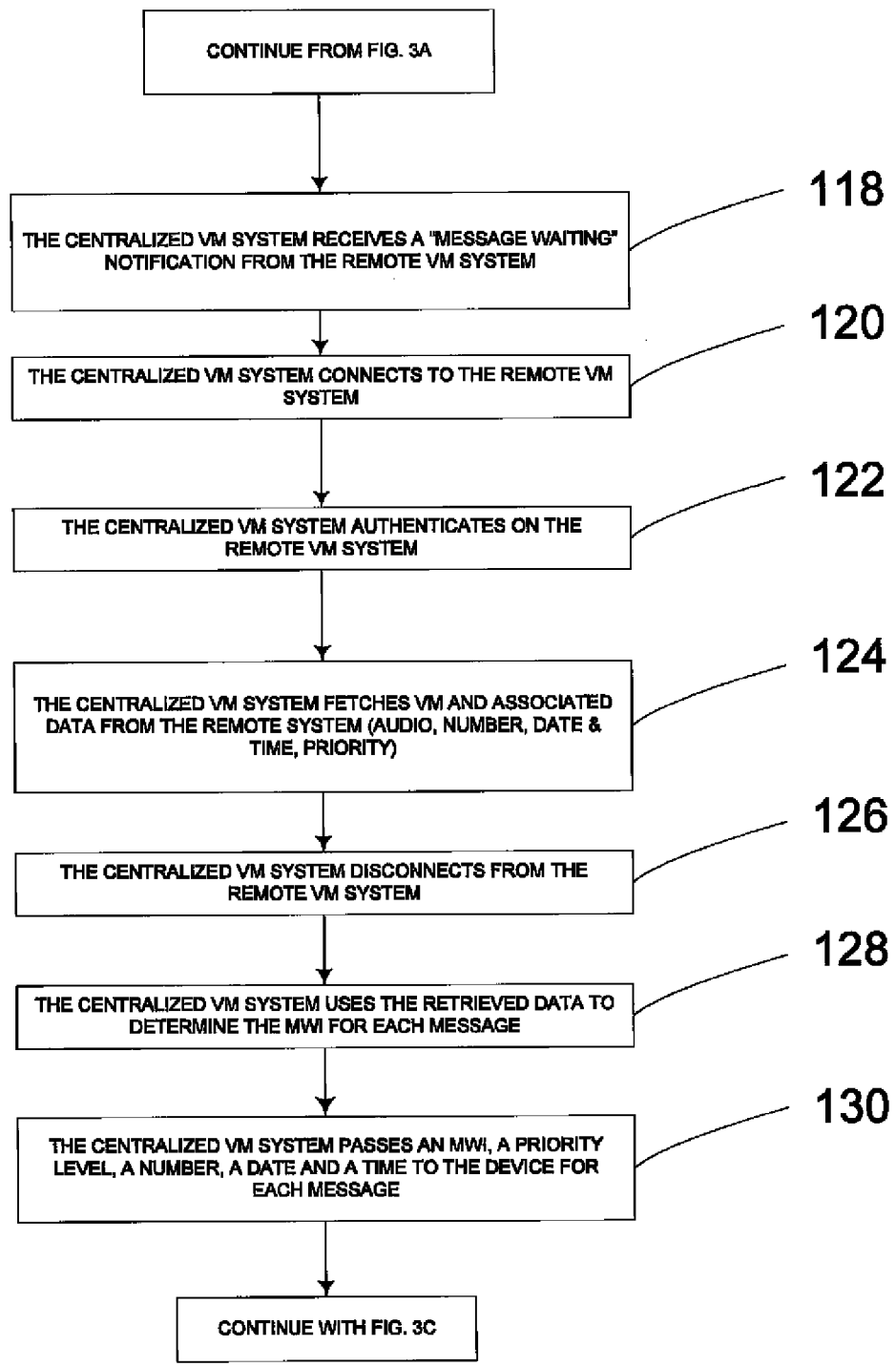
Figure 3C:
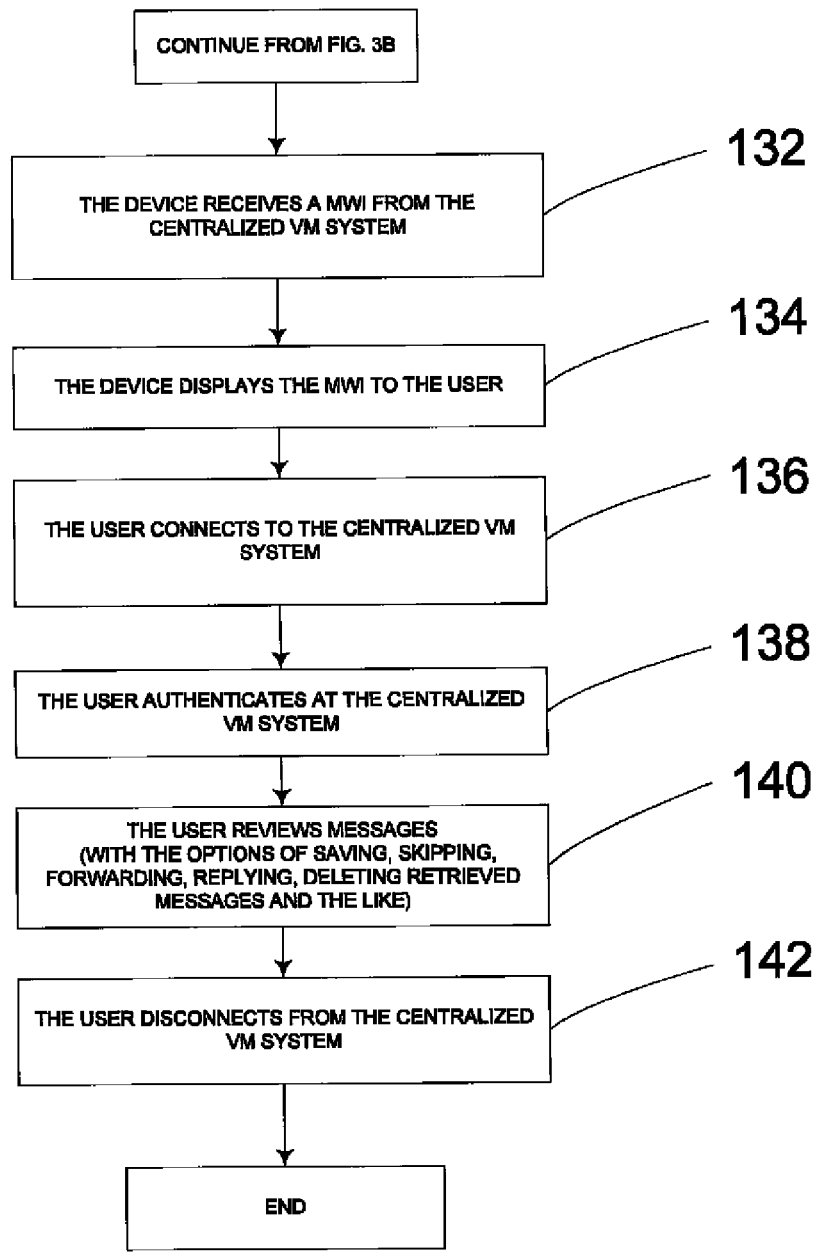

Referring now to FIGS. 3A-3C, an exemplary process for taking a voice message and passing an MWI to a device 10 in accordance with an exemplary embodiment of the present invention is illustrated. It should be understood that the illustrated and described method is exemplary only. The steps described are not presented in any particular order and performance of the steps in an alternative order(s) is possible and contemplated. The steps have been presented in the demonstrated order for ease of description and illustration. Steps can be added, omitted, and/or performed substantially simultaneously without departing from the scope of the claims.

Furthermore, although the process has been illustrated in three different figures, the process is substantially continuous. The process has been divided into convenient divisions as follows: FIG. 3A represents the portion of the process that occurs primarily at a remote telephone system. FIG. 3B represents the portion of the process that occurs primarily at a centralized VM system. FIG. 3C represents the portion of the process that occurs primarily at the user's device. These and further details will become clearer upon reading further.

The process begins with block 100 (FIG. 3A) when a caller places a call to a remote telephone number. As illustrated in block 102 of this example, there is no answer at the dialed telephone number so the call is passed to a remote VM system. At block 104, the remote system picks up the call and prompts the caller for a message. The message can be, for example, an audio or text message. In either event, as shown in block 106, the remote VM system can store an audio or text message. While the remote VM system is handling the call, the caller identification (CID) data can also be stored. For example, as shown at block 108, the VM system can store the telephone number from which the call that lead to the VM originated. Additionally, as shown at block 110, the VM system can store the date and time of the call, and at block 112, the VM system can store a priority level for the telephone call/message.

The priority level can be predetermined in a variety of ways, including being set by default, being predetermined by the user or authorized party, e.g., determined by the phone number from which the call originated. Alternatively, the caller leaving the message can be prompted to designate a priority level (e.g., "1" for "very high," "2" for "high," and the like). The user or authorized party can limit to certain callers or eliminate the ability to set priority for messages. For example, the ability to set priority could be limited to contacts that exist in the user's contacts list.

After all of the information associated with the phone call is stored, the VM system can release the call as shown at block 114. After the remote VM system releases the call, the process can proceed to block 116 at which the remote VM system can pass a "message waiting" notification to a centralized VM system. The process can now proceed with block 118 of FIG. 3B.

At block 118, the centralized VM system receives the "message waiting" notification from the remote VM system. The "message waiting" notification can be in any form, including, but not limited to, an SMS message, an MMS message, an email, a combination thereof, and the like. The notification can include an indication as to the VM platform at which the call was received. Regardless of the method used to convey the notification, the remote VM system notifies the centralized VM system that a message is waiting.

After receiving the "message waiting" notification, but not necessarily immediately after receiving the "message waiting" notification, the process can proceed to block 120, at which the centralized VM system connects to the remote VM system. As illustrated in FIGS. 3A-3C, block 120 can occur automatically upon receiving a "message waiting" notification from the remote VM system. It should be understood, however, that the process can stop at block 118 and wait for user input. In that case, the remainder of the process illustrated in FIGS. 3A-3C can occur once the user directs the device to proceed with the remainder of the process.

Returning now to the process as illustrated in FIGS. 3A-3C, after receiving the "message waiting" notification and connecting to the remote VM system, the process continues at block 122. At block 122, the centralized VM system can connect to the remote VM system "mailbox" to retrieve messages, for example, but not necessarily, by emulating the user or by authenticating as the centralized VM system. At block 124, the centralized VM system can fetch the VM from the remote system. During this step, the remote system can pass all associated information stored during blocks 106-112 (e.g., audio, phone number, date & time, priority level, etc.). This step can be repeated multiple times if multiple voice messages are waiting on the server. After all of the messages have been passed from the remote server to the centralized VM system, the centralized VM system can disconnect from the remote VM system, as shown in block 126. Upon retrieval of the messages on the remote VM system, the messages can be left on the remote VM system or can be deleted from the remote VM system.

Once the VM and its associated information has been retrieved by the centralized VM system, the centralized VM system can review the retrieved information to determine the appropriate MWI, as shown in block 128.

The MWI for any particular aspect of a call can be configured by a user, a network operator, an employer of the user, a business, or any other user with access to or control over the user's calling plan or features. The MWIs can be stored on the device 10, or can be stored on a central or remote VM system. Similarly, an assigned MWI and the associated features of a call that trigger that MWI can be stored by the device 10, a remote VM system, or centralized VM system. In the illustrated embodiment, the MWIs and the trigger conditions are stored in a database on the centralized VM system. The centralized VM system can be configured by a user, the network operator, an employer, a business, and the like to handle many aspects of the VM operations herein described.

As shown in block 130, once the MWI is determined, the centralized VM system can pass the MWI and all associated data to the device 10. This transfer can occur in a number or ways. First, the centralized VM system can use a SMS message to inform the device 10 to turn on any specific message waiting indicator, and the device 10 can include a predetermined assortment of MWIs. For example, the VM system can send a SMS message telling the device 10 to turn on the work message waiting indicator. Later, after the work messages, for example, have been retrieved, the VM system can send another SMS message to the device 10 instructing the device 10 to turn off the work message waiting indicator.

Alternatively, the centralized VM system, upon determining the appropriate MWI, can send an MMS message to the device 10 including the MWI that the phone should display. This method would eliminate the need for the device 10 to store multiple MWIs. Instead, a custom MWI can be built by the centralized VM system and sent to the device.

Regardless of the method used to send the MWI to the device 10, or to instruct the device 10 as to which MWI to display, the illustrated process can then continue with block 132 of FIG. 3C.

At block 132, the device 10 receives the MWI and the associated data from the centralized VM system. At block 134, the device 10 displays the retrieved MWI and any of the received data that can be displayed in accordance with the settings of the device 10. It should be understood that while the MWI can be determined according to the settings at the centralized VM system, the MWI can also be updated according to various aspects of the device 10. For example, if a user has an image associated with a specific number, e.g., a picture of a friend for the friend's telephone number, the MWI passed from the centralized VM system for a call from the user's friend can be replaced with the image of the user's friend stored on the device 10.

After, but not necessarily immediately after, receiving the MWI from the VM system, the user can connect to a VM system, in this case the centralized VM system, though, as will be explained later, the device can also connect to a remote VM system. This is shown in block 136. After connecting, the user can authenticate on the VM system as shown in block 138. In block 140, the user reviews the messages (including the ability to save, skip, delete, forward, reply, and the like). After completing the review of the messages, the user disconnects from the VM system as shown at block 142.

Figure 4:
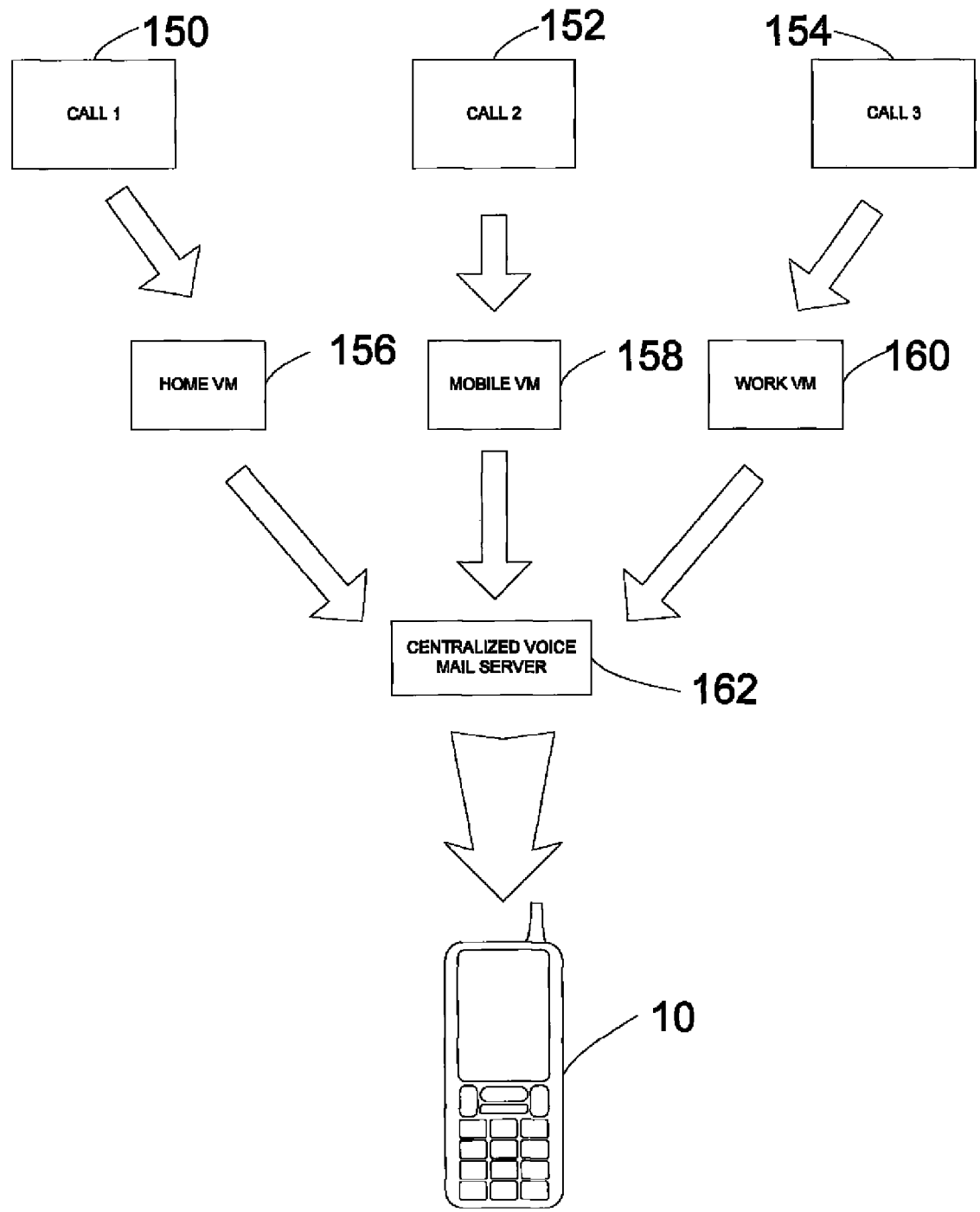
FIG. 4 schematically represents an example of an advanced message waiting indication system with three voice mail systems, according to an exemplary embodiment of the present invention.

Referring now to FIG. 4, an example is illustrated showing a multiple VM system network incorporating an embodiment of the present invention.

In FIG. 4, the user receives a first phone call ("call1") 150 at a home telephone number. The user also receives second and third phone calls ("call2" and "call3") 152, 154 at mobile and work telephone systems, respectively. As shown, the user has three separate VM systems associated, respectively, with the three telephone numbers. In particular, there is a home VM system 156 associated with the home telephone number, a mobile VM system 158 associated with the mobile telephone number, and a work VM system 160 associated with the work telephone number.

In the illustrated example, the user is not available at any of the three telephone numbers, so the calls 150, 152, 154 are passed to the respective VM systems 156, 158, 160. At each VM system, a process substantially similar to that illustrated in blocks 104-114 of FIG. 3A is completed. After each remote VM system 156, 158, 160 has stored the data associated with the calls 150, 152, 154, each of the VM systems completes a step substantially similar to block 116 of FIG. 3A, i.e., each VM system 156, 158, 160 passes a "message waiting" notification to the centralized VM system 162.

At this point, the centralized VM system 162 will complete a process substantially similar to blocks 118-130 of FIG. 3B for each of the messages. In other words, the centralized VM system 162 will connect to the home, mobile, and work VM systems 156, 158, 160 and retrieve the data associated with each of the received calls 150, 152, 154. After the centralized VM system 162 retrieves the data associated with each of the received calls 150, 152, 154, the centralized VM system can then determine the MWI for each of the waiting messages and can pass the MWI to the device 10.

The user of the device 10 can connect to the centralized VM system 162 to retrieve the messages. As shown in the illustrated example, the user can connect directly to the centralized VM server 162 to retrieve the three message(s) instead of connecting to the three remote VM systems 156, 158, 160 to retrieve each of the messages separately. If a user has multiple VM systems, e.g., a home VM 156, a mobile VM 158, and a work VM 160, then the centralized VM system 162 can be configured to complete this process for each of the remote VM systems. Though this feature seems at first glance to be primarily an issue of convenience, the use of the centralized VM system 162 can also assist the user in sorting and/or prioritizing messages. Since all three messages will appear on the device with the associated data (e.g., priority, date and time, caller, and the like), the user can see all of the messages at one time instead of having to connect three times to learn who has called at each of the three telephone numbers.

Figure 5:
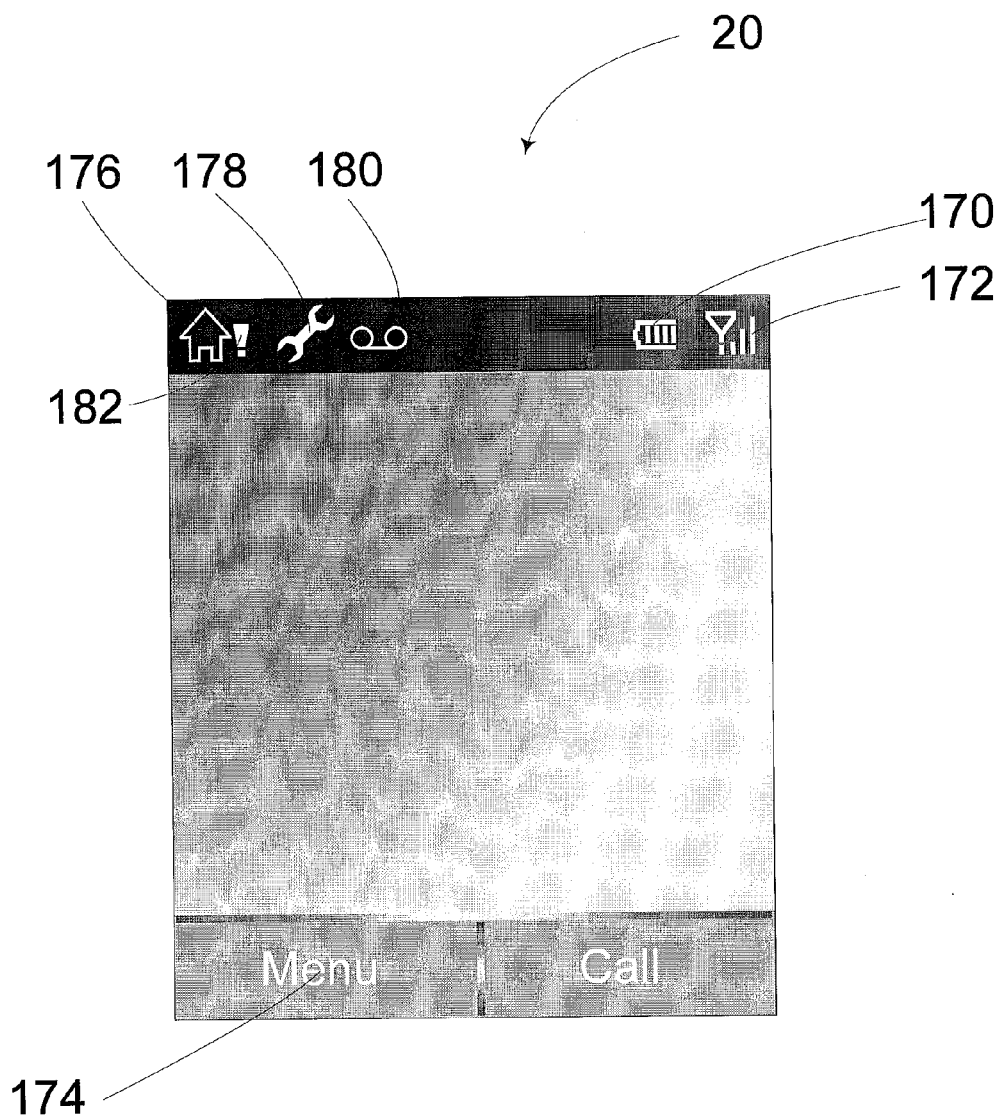
FIG. 5 is a front view of exemplary mobile communications device display employing an exemplary embodiment of the present invention.

Referring now to FIG. 5, the display 20 of a device 10 employing an exemplary embodiment of the present invention is illustrated and described in greater detail. As shown, the display 20 can present various data to the user. In the case of a handset 10, for example, the display 20 can include a battery status indication 170, a signal strength indication 172, one or more customized menu options 174, and/or any other information.

As shown, an exemplary embodiment of the present invention includes the ability to modify the display 20 of the device 10 by sending one or more message waiting indicators (MWIs) 176, 178, 180 to the device 10 for display to the user. An MWI 176, 178, 180 can include detailed information about the message and the source of the message on several levels. For example, as will be described in further detail below, an MWI could include visual representations for the time of a call, the telephone number from which that call originated, the caller who placed that call, the priority of the VM message, the age of the VM message, and a particular aspect of the VM system that received the message, and the like. The MWI could combine all of this information into a single visual representation for quick presentation to the user.

As illustrated, multiple MWIs 176, 178, 180 can be displayed at any given time representing numerous messages and information about the messages e.g., time of the call, source of the call, and the like.

In the illustrated display, the user of the device has three messages waiting and the messages resulted from calls placed to three different VM systems 156, 158, 160 (FIG. 4).

Returning to the illustrated example of FIG. 5, the caller to the home VM system 156 left a message and indicated that the message is to be classified as a high-priority message. It should be understood that there are may contemplated methods of setting the priority level of a message. For example, the priority level of a message can be automatically assigned if a caller's phone number exists in the device 10 memory or address book. Additionally, a business could set automatically raised priority levels for calls received from co-workers, clients, supervisors, and the like. Regardless of the method used to set a priority level, the priority level can be passed to the device 10 for inclusion in the MWI.

The priority indication can be communicated to the user, for example, by the addition of an exclamation point 182 to the home VM system MWI 176. It should be understood, however, that the priority level of a message can be indicated in a number of ways, e.g., color-coding, letters, numeric codes, characters, other parameters, images, animated images, a blinking MWI, a combination thereof, and the like, and is not limited to the use of an exclamation point 182.

In addition to the message waiting on the home voice mail system 156, the user also has a message at a work VM system 160 as denoted by the work VM system MWI 178. The caller leaving the message at the work VM system 160 did not note a priority level for the message, and there were no preset priority codes for the caller.

Finally, the mobile VM system MWI 180 informs the user that a message is waiting on the mobile VM system 158. As was the case with respect to the work voice mail message waiting indicator 178, MWI 180 does not include a priority level.

As will now be appreciated, it is possible that a plurality of messages can be received from a plurality of VM systems. Consequently, a plurality of MWIs may need to be simultaneously represented on the device display 20. In such a scenario, the user may wish to see an expanded view of the MWIs since the smaller MWI icons may not be able to display all desired information simultaneously in an easily readable format. In such a case, the device 10 can be configured to allow a user to see a detailed view of the MWIs.

Figure 6:
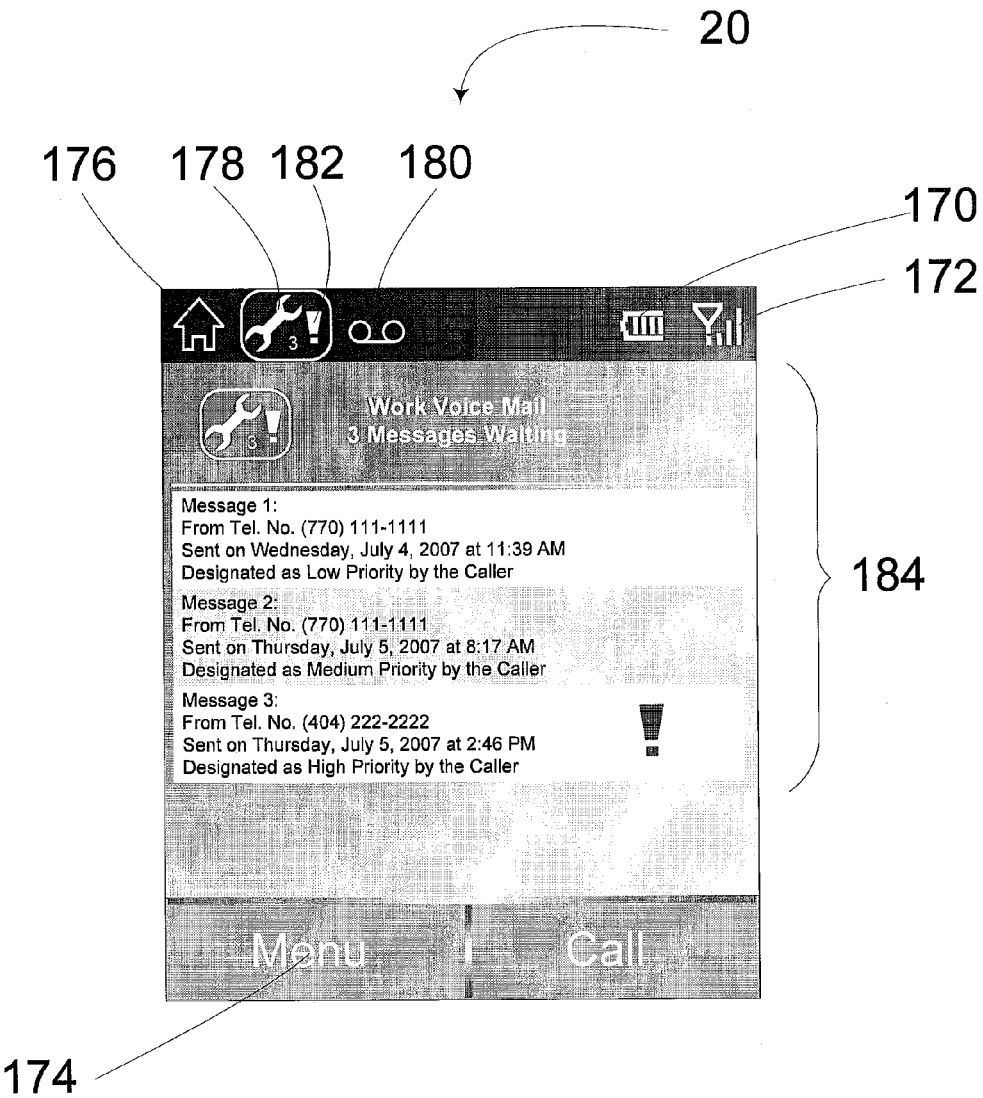
FIG. 6 is a front view of an exemplary mobile communications device display employing an alternative exemplary embodiment of the present invention.

In FIG. 6, a device display 20 is shown. In FIG. 6, the user is viewing an exemplary embodiment of a detailed MWI display. In the illustrated example, the user is viewing the MWIs for the work VM system. As can be seen from the exemplary work MWI 178, there are three messages waiting that have been left at the work VM system 160. Furthermore, in the illustrated example, at least one of three messages at the work VM system was left with a high priority level, denoted in the illustrated example by the inclusion of an exclamation point 182. The user can select an MWI 176, 178, 180 for further detail of the messages waiting. Once an MWI 176, 178, 180 is selected, the display 20 shows each of the received messages and various data associated with those messages (e.g., priority level, date and time, telephone number, MWI, and the like). In the illustrated example, the further detail for the messages is displayed for the user in a list 184. The list 184 can give added detail of the MWIs to the user and can allow a user to more fully understand the context of each of the waiting messages, as opposed to merely receiving a numerical indicator denoting the number of messages waiting on the VM system. The list 184 can also provide the user with the ability to bypass message retrieval by providing priority levels and phone numbers. If a user wishes, he can dial the number directly to interface with the caller who left the message, thereby eliminating-some delay in retrieving the messages.

While the detailed view 184 is illustrated as a list, it should be appreciated that the detailed view does not have to be a list. Instead, multiple MWIs could be displayed; one for each message. Furthermore, while the illustrated example shows only messages for the work VM system 160, it is possible and is certainly contemplated that all messages from all VM systems could be simultaneously displayed, thereby further enhancing the ability of the user to bypass unimportant messages in favor of important messages.

Referring again to the content of the MWI packet, in addition to the content explained above, the MWI can also include a "place holder." A place holder can be, for example, a unique ID for a given MWI message. When sent as a part of an MWI, the place holder gives the VM systems and the device 10 the ability to uniquely identify each MWI and associate each MWI with a specific message. If the MWI includes the place holder, then messages can be deleted out of sequence and the VM systems and the device 10 can update the MWI without sending all new MWIs, if desired. For example, if a user has 3 messages on a work VM system, and 2 messages on a home VM system, the device 10 can display two message waiting indicators—one for home and one for work—with data as to the number of messages waiting. If the user deletes one message from the home VM system, then the MWI for that specific message can be deleted by instructing the device 10 to delete the MWI with the place holder associated with that message.

Another feature that can be included in an embodiment of the present invention is the ability to "age" the MWIs. As a message waits in the inbox, the MWI can be animated to display the age of the message. For example, an MWI could have white lines on the first day of delivery. Each day, the lines could get darker (e.g., gray). Such animation could provide the user with some sense of the age of the message. Other "aging" methods are contemplated, e.g., providing a numerical indication of the number of days the message has been waiting, animating changes in the MWI (e.g., a face slowly grows a beard as the message ages), and the like. Such aging could provide the user with another level of detail that can enable the user to prioritize messages. Furthermore, the priority level of a message can be adjusted based on the age of a message (either raised priority or lowered priority). Alternatively, the "life of," i.e., the time limit for displaying, an MWI can be limited. For example, the user can decide that any message over one day old should not be represented by an MWI. In such a case, the MWI will disappear after one day.

Another contemplated feature includes the ability to place an MWI next to a contact in the address book. For example, if a friend named Friend called a user and left a message at the work VM system 160, then an MWI can be placed next to Friend's name in the contact list. Therefore, when a user uses the address book/contact list of the device 10, he can see an MWI next to Friend's name.

Although most of the preceding description has described the use of message waiting indicators, the concept could be used to inform users of missed calls as well. In such a case, a missed call can be logged at a remote phone system. Information about the call can be stored, e.g., the date and time of the call, the telephone number of the caller, and the like. A "missed call" notification can be sent to the centralized VM system. The centralized VM system can connect to the remote telephone system to retrieve data about the call (e.g., the telephone number of the caller, the priority level if one exists for that caller, the date and time, and the like) and the appropriate missed call indicator for the caller and the telephone system can be set and sent to the electronic device. Each of these steps can be performed in a manner substantially similar to the method used to send MWIs to the electronic device, though the steps relating to storing and fetching messages can be omitted.

Additionally, while the description has set forth the invention using remote and centralized VM systems, it must be appreciated that each of the remote VM systems can carry out the functions of the centralized VM system regarding setting MWIs and sending them to the device 10. In such an embodiment, the remote VM systems can send MWIs directly to the device 10. In addition, or alternatively, the device 10 can connect directly to the remote VM system to retrieve messages from the remote VM system. As such, the centralized VM system may be unnecessary (if the remote VM system sends the MWI and the device 10 connects directly to the remote VM system). Alternatively, the centralized VM system can connect to the remote VM system to get information from which to determine the MWI, but, to reduce data transfer, the device can connect directly to the remote VM system. While the functionality of any of these contemplated combinations is similar, the hardware and software demands of each contemplated embodiment has certain strengths. Therefore, all are possible embodiments of the present invention.

The preceding description has been directed to one of ordinary skill in the art. Thus, while the "network" has been implicitly included in the foregoing description, the network has not been described in detail. Therefore, the following portion of the description is included for any readers who are not readily familiar with a typical exemplary telecommunications network.

Figure 7:
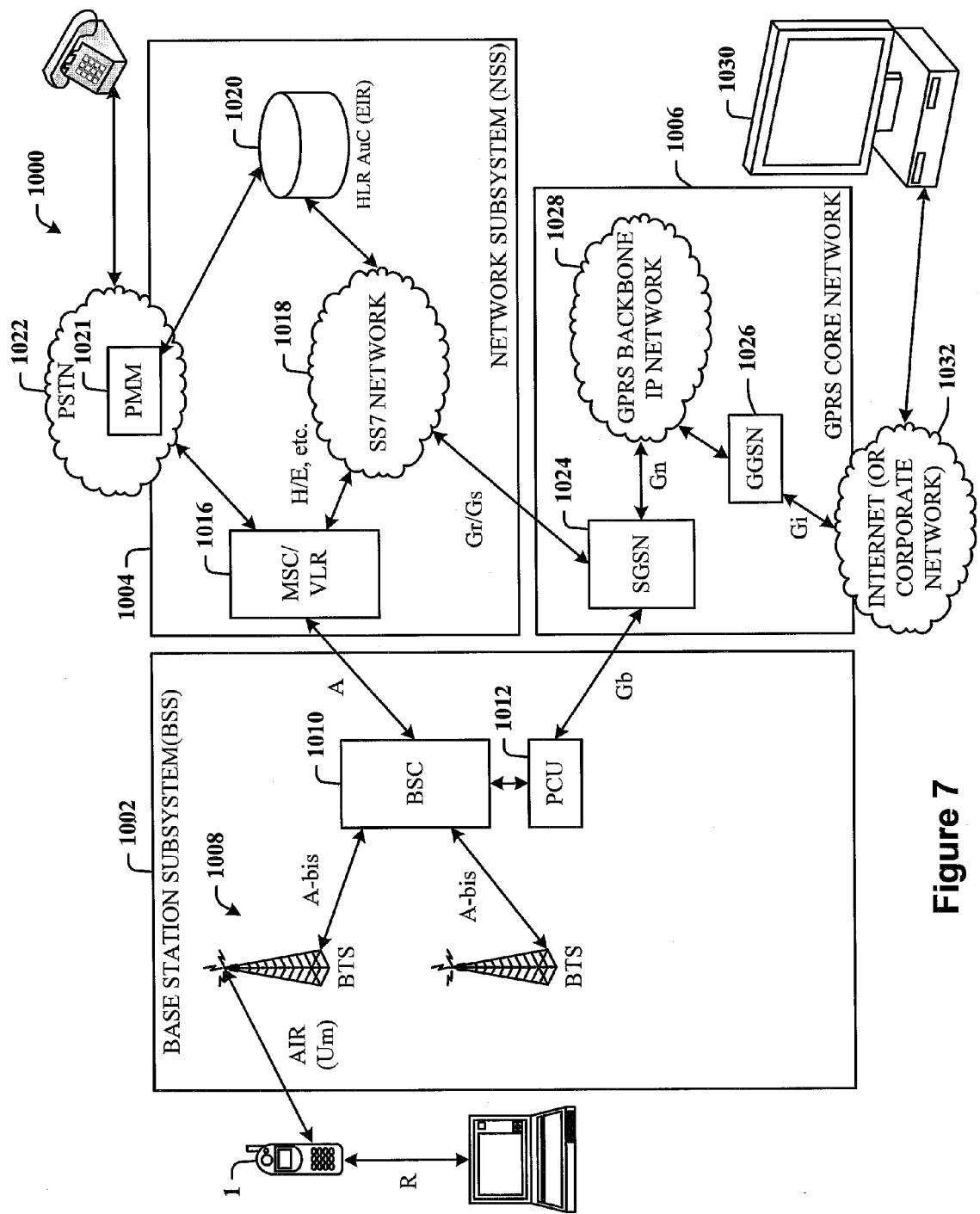
FIG. 7 is a schematic diagram of an exemplary GSM network.

FIG. 7 illustrates an exemplary telecommunications network 1000 in which the present invention can be employed. In the illustrated embodiment, the telecommunications network 1000 is a GSM network. The GSM network 1000, designed as a 2G cellular communications system, utilizes time division multiple access (TDMA) technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 1000 includes a base station subsystem (BSS) 1002, a network subsystem (NSS) 1004 and a GPRS core network 1006. The BSS 1002 can include one or more base transceiver stations (BTS) 1008 and a base station controller (BSC) 1010 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 1012 is shown connected to the BTS 1010 although the exact position of this can depend on the vendor architecture. The BSS 1002 is connected by the air interface Um to a mobile terminal 1014. The BTS 1008 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 1010 provides the intelligence behind the BTS 1008. Typically, a BSC can have tens or even hundreds of BTS's 1008 under its control. The BSC 1010 handles allocation of radio channels, receives measurements from the mobile phones, and controls handovers from BTS to BTS (except in the case of an inter-MSC handover in which case control is in part the responsibility of the an MSC). One function of the BSC 1010 is to act as a concentrator such that many different low capacity connections to the BTS 1008 can become reduced to a smaller number of connections towards the MSC. Generally, this means that networks are often structured to have many BSCs 1010 distributed into regions near the BTS 1008 which are then connected to large centralized MSC sites.

The PCU 1012 can perform some of the equivalent tasks of the BSC 1010. The allocation of channels between voice and data can be controlled by the base station, but once a channel is allocated to the PCU 1012, the PCU 1012 takes full control over that channel. The PCU 1012 can be built into the base station, built into the BSC, or even in some architecture, it can be at an SGSN site.

The BSS 1002 connects to the NSS 1004 by an A interface. The NSS 1004 is shown containing an MSC 1016 connected via an SS7 network 1018 to an HLR 1020. The AuC and the EIR, although technically separate functions from the HLR 1020, are shown together since combining them can be performed in the network. The HLR 1020 can interface to a preliminary mobility management (PMM) component 1021 that facilitates pre-mobility analysis in accordance with the disclosed architecture.

The combination of a mobile communications device 10 and a SIM card (not shown) creates a special digital "signature" that includes a subscriber number which is sent from the device 10 to the nearest BTS 1008 asking that the subscriber of a particular network be allowed to use the network. The request is passed on along the network of BTS 1008 to the heart of a cellular network, the MSC 1016. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The NSS 1004 also contains the component called HLR 1020 that provides the administrative information required to authenticate, register and locate the caller as that network's subscriber. Once the HLR 1020 has received a log-on request, the HLR 1020 immediately checks the special "signature" contained in the request against the HLR special subscriber database. If the subscription is current, the MSC 1016 sends a message back to the phone via the network of BTS 1008 that indicates the caller is allowed to access the network. The name or code of that network can appear on the display 20 of the device 10. Once this network "name" message appears on the display 20, it means the caller is connected to the network 1000 and able to make and receive calls.

The HLR 1020 registers which MSC the device 10 is currently connected to, so that when the network MSC 1016 needs to route an incoming call to the device phone number, it will first check the HLR 1020 to see which MSC is currently serving the device 10. Periodically, the device 10 will send a message to the MSC indicating where it is, in a process called polling. The combination of the tracking function and the caller's unique digital signature allows the MSC 1016 to route that call to the precise base station the cell phone happens to be connected to, and then exclusively to the device 10, even if a number of other subscribers are simultaneously connected to that base station.

When traveling to another MSC coverage area while driving, for example, the HLR 1020 is automatically updated, and continues to monitor where exactly it should route the calls should the caller then move within range of another base station. This routing procedure means that out of hundreds of thousands of subscribers, only the correct cell phone will ring when necessary.

The NSS 1004 has a direct connection to the PSTN (public switched telephone network) 1022 from the MSC 1016. There is also a connection to and from the NSS 1004 to the GPRS core network 1006 via a Gr/Gs interface although this is optional and not always implemented. The illustrated GPRS Core Network 1006 is simplified to include a SGSN 1024 (connected to the BSS 1002 by the Gb interface) and a GGSN 1026. The SGSN 1024 and the GGSN 1026 are connected together by a private IP network 1028 called a GPRS backbone shown as the Gn reference point. A computer 1030 is depicted as connecting to the core network 1006 via an Internet or corporate network 1032.

Some VM systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

Although applicable to any existing or yet to be developed wireless telecommunications network, aspects of the disclosed architecture have been described with reference to the GSM air interface that uses general packet radio service (GPRS) as an enabling bearer. As indicated above, examples of other suitable wireless and radio frequency data transmission systems include networks utilizing TDMA, frequency division multiple access (FDMA), wideband code division multiple access (WCDMA), orthogonal frequency division multiplexing (OFDM), and various other 2.5 and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols.

Figure 8:
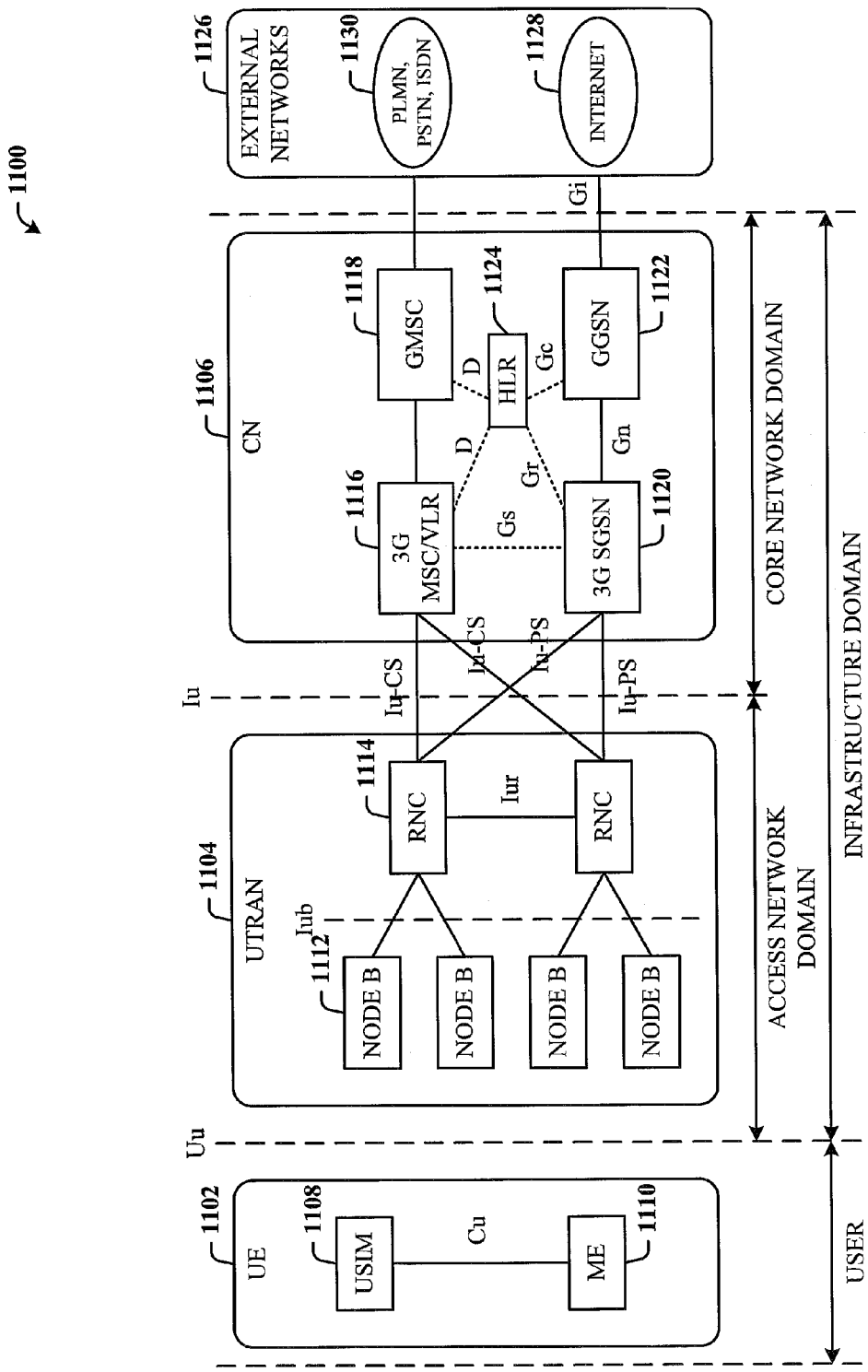
FIG. 8 is a schematic diagram of an exemplary UTMS network.

FIG. 8 illustrates an exemplary UMTS network 1100 that facilitates pre-mobility management analysis in call communications. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection-oriented and connectionless services can be offered for point-to-point and point-to-multipoint communications.

The UMTS network 1100 can consist of three interacting domains; a user equipment (UE) domain 1102, a UMTS Terrestrial Radio Access Network (UTRAN) domain 1104, and a core network (CN) domain 1106. The UTRAN domain 1104 is also referred to as the access network domain and the CN 1106 is referred to as the core network domain, the both of which comprise an infrastructure domain.

The UE domain 1102 includes a USIM (user services identity module) domain and an ME (mobile equipment) domain. User equipment is the equipment used by the user to access UMTS services. In the UE domain 1102, the UMTS IC card is the USIM 1108 which has the same physical characteristics as GSM SIM (subscriber identity module) card. The USIM interfaces to ME 1110 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 1104 provides the air interface access method for the UE domain 1102. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 1112, and control equipment for Node-B devices is called a radio network controller (RNC) 1114. The interface between the Node-B device and the RNC 1114 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a MSC/VLR 1116, and GMSC 1118. Packet-switched elements include a serving GPRS support node (SGSN) 1120 and gateway GPRS support node (GGSN) 1122. Some network elements such as an EIR (equipment identity register) (not shown), HLR (home location register) 1124, VLR and AuC (authentication center) (not shown) can be shared by both domains.

A function of the CN 1102 is to provide switching, routing and transit for user traffic. The CN 1102 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 1106 interfaces to the radio access domain via an Iu interface. An Iu-CS (circuit-switched) reference point interfaces an RNC of the access network to the MSC/VLR entity 1116 of the CN 1106 for voice from/to the MSC/VLR 1116. An Iu-PS (packet-switched) reference point interfaces an RNC of the access network to the SGSN entity 1120 of the CN 1106 for data from/to the SGSN 1120.

In the CN 1106, a Gs interface is provided between the MSC/VLR 1116 and the SGSN. A Gn interface is provided between the SGSN 1120 and the GGSN 1122. A D interface is provided between the MSC/VLR 1116 and the HLR 1124, and the HLR 1124 and the GMSC 1118. A Gr interface is provided between the SGSN 1120 and the HLR 1124. A Gc interface is provided between the GGSN 1122 and the HLR 1124.

The CN 1106 provides the interface from the UE domain 1102 to external networks 1126 such as the Internet 1128 via a Gi interface from the GGSN 1122, and other networks 1130 via the GMSC 1118, which can include a PLMN (public land mobile network), PSTN and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 1106 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A multiple voice-mail system notification network comprising:
   at least two remote voice-mail systems, each remote voice-mail system being associated with a distinct phone number associated with a user of a mobile communications device; and
   a centralized voice-mail system in communication with the remote voice-mail systems;
   wherein the centralized voice-mail system is configured to:
      receive a distinct message-waiting notification from each of the remote voice-mail systems, each distinct message-waiting notification notifying the centralized voice-mail system of a respective message received by the remote voice-mail system;
      establish a connection with each remote voice-mail system, automatically in response to having received the message-waiting notification from the remote voice-mail systems;
      receive the respective message and data associated with each message from each remote voice-mail systems, the data associated with each message comprising a priority level of the message and at least one of a date, a time, a telephone number of a caller who initiated the message, an electronic address of the caller who initiated the message, and a place holder for information associated with the caller who initiated the message, wherein the priority level of the message is established by an authorized calling party and a party is authorized only if the calling party is identified in a contacts list associated with the user of the mobile communications device;
      determine a message-waiting indicator, corresponding to each distinct message-waiting notification, based on the data associated with the message, each message-waiting indicator indicating a distinct voice-mail platform corresponding to the remote voice-mail system from which the message was received and to the phone number; and
      transfer each determined message-waiting indicator, including indication of the voice-mail platform, to the mobile communications device for simultaneous display of each message-waiting indicator indicating the voice-mail platform to the user via the mobile communications device.

2. The multiple voice-mail system notification network of claim 1, wherein the distinct phone numbers associated with the user include phone numbers associated with at least two types of phone numbers selected from a group of phone-number types consisting of: a work phone account of the user; a home phone account of the user; and a mobile phone account of the user.

3. The multiple voice-mail system notification network of claim 1, further comprising the mobile communications devices, wherein the mobile communications device is configured to receive each message-waiting indication, indicating the platform associated with the voice-mail system at which the message was received, and simultaneously display each message-waiting indication to the user of the mobile communications device, including the voice-mail platform for each message-waiting indication.

4. The multiple voice-mail system notification network of claim 3, wherein the mobile communications device is configured to, in being configured to simultaneously display each message-waiting indication to the user of the mobile communications device, including the voice-mail platform for each message-waiting indication, display a visual icon corresponding to each of the voice-mail platforms to the user of the mobile communications device.

5. The multiple voice-mail system notification network of claim 4, further comprising the mobile communications devices, wherein the mobile communications device is configured to, in response to user input, display for the user a detailed view including details of messages associated with only a particular one of the message-waiting indicators, and so associated with only a particular voice-mail platform, and voice mail system of the at least two voice mail systems.

6. The multiple voice-mail system notification network of claim 4, further comprising the mobile communications devices, wherein the mobile communications device is configured to, in response to custom input, display for the user a detailed view simultaneously showing details of each message, including identification of the associated voice-mail platform.

7. A method, for providing a message-waiting indicator to a mobile communications device, the method comprising:
   receiving, at a centralized voice-mail system, a distinct message-waiting notification from each of multiple voice-mail systems, each message-waiting notification notifying the centralized voice-mail system of a respective message received by the remote voice-mail system;
   establishing a connection between the centralized voice-mail-system and the remote voice-mail system, automatically, in response to receiving the message-waiting notification from each of the remote voice-mail systems;

authenticating the centralized voice-mail system on each remote voice-mail system;

receiving, at the centralized voice-mail system via the connection, each respective message and data associated with the respective message from the remote voice-mail systems, the data associated with each message comprising a priority level of the message and at least one of a date, a time, a telephone number of a caller who initiated the message, an electronic address of the caller who initiated the message, and a place holder for information associated with the caller who initiated the message, wherein the priority level of the message is established by an authorized calling party and a party is authorized only if the calling party is identified in a contacts list associated with the user of the mobile communications device;

determining, at the centralized voice-mail system, a message-waiting indicator, corresponding to each distinct message-waiting notification, based on the data associated with the message, each message-waiting indicator indicating a distinct voice-mail platform corresponding to the remote voice-mail system from which the message was received;

transferring each determined message-waiting indicator, including indication of the voice-mail platform, from the centralized voice-mail system to the mobile communications device for simultaneous display of each distinct message-waiting indicator, including the voice-mail platform, to the user via the mobile communications device;

causing to be displayed to the user of the mobile communications device the message-waiting indication indicating the voice-mail platform by a visual icon corresponding to the voice-mail platform;

causing to be displayed to the user, in a visual representation of a contact list associated with a user, a particular message-waiting indication in association with a particular contact of the contact list, wherein a particular message associated with the particular message-waiting indication was received from the particular contact; and causing an age feature to be displayed to the user of the mobile communication, the feature notifying the user of an age of at least one of the messages, the feature including at least one non-alpha-numeric indication of age.

8. The method of claim 7, further comprising causing to be displayed to the user, in response to user input, a detailed view including details of messages associated with only a particular one of the message-waiting indicators, and so associated with only a particular voice-mail platform, and voice mail system of the at least two voice mail systems.

9. The method of claim 8, further comprising causing to be displayed to the user, in response to user input, a detailed view simultaneously showing details of each message, including identification of the associated voice-mail platform.

10. A mobile communications device comprising:
a communications component;
a display;
a processor operatively coupled to the communications component and the display;
a memory operatively coupled to the processor, the memory comprising instructions that, when executed by the processor, cause the processor to:

receive, via the communications component, at least two message-waiting indicators from a centralized voice-mail system, wherein:

each message-waiting indicator is associated with a distinct remote voice-mail system and comprising data associated with a distinct message received at the remote voice-mail system, the message-waiting indicator indicates a voice-mail platform associated with the remote voice-mail system at which the message was received; and the data comprises a priority level of the message and at least one of a date, a time, a telephone number of a caller who initiated the message, an electronic address of the caller who initiated the message, and a place holder for information associated with the caller who initiated the message, wherein the priority level of the message is established by an authorized calling party and a party is authorized only if the calling party is identified in a contacts list associated with the user of the mobile communications device;

present the at least two message-waiting indicators simultaneously to the user by way of the display, each indicator indicating the associated voice-mail platform, such that a user of the mobile communications device can evaluate whether to retrieve each message from the centralized voice-mail system based at least in part upon the priority level and voice-mail platform included in the message-waiting indicators;

display to the user of the mobile communication an age feature notifying the user of an age of at least one of the messages, the feature including at least one non-alpha-numeric indication of age; and in displaying to the user of the mobile communications device the message-waiting indication indicating the voice-mail platform, display a visual icon corresponding to the voice-mail platform.

11. The mobile communications device of claim 10, wherein the memory further comprises instructions that, when executed by the processor, cause the processor to, in displaying the age feature, display at least one feature selected from a group of features consisting of:
a color indicating the age; and
an animation indicating age indicating the age.

12. The mobile communications device of claim 10, wherein the memory further comprises instructions that, when executed by the processor, cause the processor to, in response to user input, display for the user a detailed view including details of messages associated with only a particular one of the message-waiting indicators, and so associated with only a particular voice-mail platform, and voice mail system of the at least two voice mail systems.

13. The mobile communications device of claim 10, wherein the memory further comprises instructions that, when executed by the processor, cause the processor to, in response to custom input, display for the user a detailed view simultaneously showing details of each message, including identification of the associated voice-mail platform.

* * * * *